United States Patent [19]

Cap et al.

[11] 3,935,524

[45] Jan. 27, 1976

[54] CIRCUIT ARRANGEMENT FOR DETECTING VOLTAGE DIFFERENCES

[75] Inventors: Heinrich Cap, Vienna; Herbert Krammer, Hinterbruhl; Robert Scheiber, Vienna, all of Austria

[73] Assignees: Karl Vockenhuber; Raimund Hauser, both of Vienna, Austria

[22] Filed: Sept. 26, 1973

[21] Appl. No.: 401,112

Related U.S. Application Data

[62] Division of Ser. No. 206,466, Dec. 9, 1971, Pat. No. 3,806,789.

[30] Foreign Application Priority Data

| Dec. 15, 1970 | Austria | 11286/70 |
|---|---|---|
| Dec. 16, 1970 | Austria | 11337/70 |
| Dec. 17, 1970 | Austria | 11397/70 |

[52] U.S. Cl. ........ 318/640; 307/235 H; 307/235 T; 318/678; 318/681; 352/141; 354/44
[51] Int. Cl.² ...................... G03B 7/10; G05B 1/06
[58] Field of Search ........ 307/235 R, 297; 328/146, 328/147, 148, 149; 318/561, 640, 678, 679, 681; 352/141, 177; 354/26, 29, 30, 40, 43, 44

[56] References Cited
UNITED STATES PATENTS

| 3,278,761 | 10/1966 | Goyer | 307/297 X |
|---|---|---|---|
| 3,317,901 | 5/1967 | Clapper | 307/297 x |
| 3,365,587 | 1/1968 | Baur | 307/235 X |
| 3,386,081 | 5/1968 | Varsos | 307/235 X |
| 3,475,622 | 10/1969 | Andersen et al. | 307/235 X |
| 3,523,228 | 8/1970 | Currie et al. | 318/681 X |
| 3,538,444 | 11/1970 | Adlhoch | 307/235 X |
| 3,539,830 | 11/1970 | Zollinger | 307/235 |
| 3,567,967 | 3/1971 | Fiorino et al. | 307/235 |
| 3,573,495 | 4/1971 | Xylander | 307/235 |
| 3,602,799 | 8/1971 | Guillen | 307/297 X |
| 3,611,894 | 10/1971 | Minneste, Jr. | 354/44 X |
| 3,704,656 | 12/1972 | Ogiso et al. | 354/43 X |
| 3,727,107 | 4/1973 | Fujie et al. | 307/235 X |
| 3,747,487 | 7/1973 | Tanikoshi et al. | 354/40 |

FOREIGN PATENTS OR APPLICATIONS

| 4,425,303 | 10/1969 | Japan | 307/297 |
|---|---|---|---|
| 1,438,232 | 2/1969 | Germany | 307/297 |

OTHER PUBLICATIONS

Millman & Taub, Pulse, Digital, and Switching Waveforms; McGraw–Hill Book Co.; 1965, pp. 389–402.

*Primary Examiner*—John S. Heyman
*Assistant Examiner*—L. N. Anagnos
*Attorney, Agent, or Firm*—Ernest G. Montague; Karl F. Ross; Herbert Dubno

[57] ABSTRACT

An electronic switching system for the control of a load, such as a motor serving to adjust the diaphragm of a motion-picture camera, comprises a normally inactive comparison circuit including a transistor bridge with a pair of NPN transistors in one pair of adjoining arms and a pair of PNP transistors in the other pair. Two complementary transistors in each half of the bridge, lying between diagonally opposite corners, are provided with a common biasing circuit shunted across that bridge diagonal, the load being connected across the other bridge diagonal. Each biasing circuit includes a resistive voltage divider with taps joined to the bases of the associated bridge transistors and a group of cascaded ancillary transistors connected across a section of the voltage divider containing one of these taps. The first ancillary transistor of each cascaded group has its base connected to an associated input terminal receiving a switching signal and a reference voltage, respectively. A differential amplifier, connected across the input terminals, emits an unbalance signal which applies power to a pair of normally open-circuited ancillary transistors, forming part of the two cascaded groups to activate the comparison circuit by energizing the emitters of these ancillary transistors via a switching stage including a constant-current source.

16 Claims, 4 Drawing Figures

CIRCUIT ARRANGEMENT FOR DETECTING VOLTAGE DIFFERENCES

This is a divisional patent application of our copending patent application Ser. No. 206,466 filed Dec. 9, 1971, now U.S. Pat. No. 3,806,789.

Our present invention relates to a circuit arrangement for the control of a load, such as a motor for adjusting a diaphragm of a motion-picture camera, fed from a direct-current source.

A system of this type may comprise a comparator circuit, preceded by a differentiating stage, and a photoelectric transducer which receives light, e.g., from a reflecting shutter. In such a system it is a disadvantage that the motor as well as the photoelectric transducer used for automatic diaphragm control have a certain integrating effect which in practice results in a phase displacement between the desired bahavior and the actual behavior of the motor. This means that the lag which is introduced by the photoelectric transducer and by the motor results in a delay of the response and de-energization relative to the occurrence of variations of light. The long starting and coasting times of the motor may induce oscillations in the system. To avoid these problems, it is conventional to reduce the adjusting speeds by using automatic control systems having a low gain and in some cases intentionally introducing a relatively high mechanical uncertainty of the response. The disadvantages involved in these measures had heretofore to be tolerated.

The object of our present invention is to provide an improved circuit arrangement for detecting the existence of voltage differences between two signals, e.g. between a reference voltage and the output voltage of a photoselective transducer illuminated through a diaphragm of a motion-picture camera provided with adjustment means, which suppresses hunting by minimizing the integrating effect of the load and of an associated generator of switching signals such as a photoelectric transducer.

In accordance with our present invention, such a circuit arrangement comprises a normally inactive comparison circuit advantageously including a transistor bridge having an input diagonal connected across a direct-current power supply and an output diagonal connected across a load, the arms of that bridge circuit being constituted by a first pair of complementary (PNP and NPN) bridge transistors on one side of the input diagonal and a second pair of complementary bridge transistors on the other side thereof. Each pair of bridge transistors is provided with a respective biasing circuit including a resistive voltage divider connected across the power supply, the bases of the bridge transistors being connected to respective taps on the associated voltage divider. A section of each voltage divider, including one of its base-biasing taps, is shunted by an ancillary transistor forming part of a cascaded group of such transistors, one of the ancillary transistors of one group being provided with an input terminal receiving a variable signal voltage while the corresponding transistor of the other group is connected to a source of reference voltage. A differential amplifier, connected across the two input terminals, generates an unbalance signal whenever the potentials of these terminals differ from each other; this differential amplifier controls switching means connected to an activating lead of the comparison circuit — as by being inserted in a common emitter circuit of an ancillary transistor from each cascaded group — for deactivating the ancillary transistors in the absence of such an unbalance signal, i.e. when no control operation such as the adjustment of a diaphragm is required. In this deactivated condition, the voltage dividers may so bias the bridge transistors that two homopolar (e.g. PNP) transistors thereof conduct whereas the other two bridge transistors are cut off, thereby short-circuiting the output diagonal and the load connected thereacross.

The above and other features of our invention will now be described in detail with reference to the accompanying drawing in which.

Figure 1:
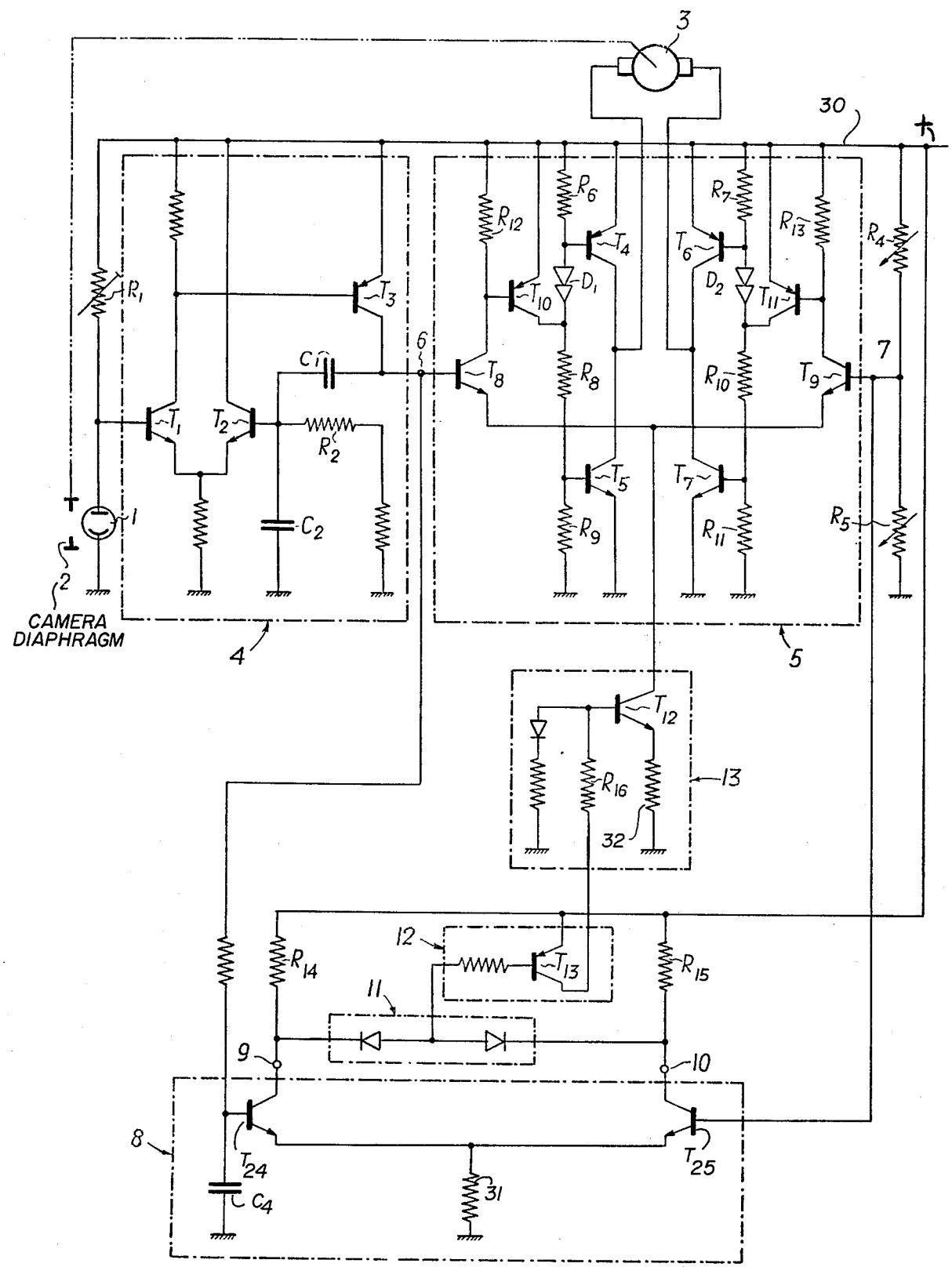
FIG. 1 shows a complete circuit diagram illustrating a switching system embodying our invention.

An automatic diaphragm-control system of a camera embodying our invention includes in circuit with a d.c. source, represented by a positive bus bar 30 and ground, a photoelectric transducer consisting of a photoconductor 1, which receives light through a diaphragm 2 juxtaposed therewith and controlled by a motor 3 responsive to the output of the photoconductor 1.

The photoconductor 1 is included in one branch of a voltage divider whose other branch includes an adjustable resistor $R_1$. The intermediate tap of the voltage divider is connected to a differentiating stage 4 working into a comparison circuit 5 which feeds current to the motor 3 to cause the same to run in one direction or the other and thus to open or close the diaphragm 2. The comparator 5 has two inputs 6, 7 which are connected to a differential amplifier 8 as well as to the bases of two input transistors $T_8$, $T_9$. The two outputs of the differential amplifier are connected by terminals 9, 10 to an OR gate 11. Photoconductor 1 and resistor $R_1$ are two arms of a resistance bridge whose other arms are a pair of adjustable series resistors $R_4$, $R_5$.

The differential amplifier 8 and the OR gate 11 detect whether the comparator 5 is balanced. When this is the case, the motor 3 is deenergized by a control stage 12 and a switching circuit consisting of a constant-current source 13. This is important because the short-circuit current flowing through the motor 3 is particularly high in intermittently controlled circuits. As will be described hereinafter, this circuit enables an intermittently controlled energization of the motor. The differentiating stage 4 which precedes the motor 3 signals to the motor that it approaches its desired position so that the motor is progressively decelerated as it approaches that position. In this way, an overshoot beyond the desired position and a hunting of the arrangement about that position will be avoided, and a high adjusting speed becomes possible in conjunction with a highly accurate adjustment. It is not essential to arrange the differentiating stage 4 before the comparator circuit 5 although this arrangement will result in simpler circuitry.

The differentiating stage 4 essentially consists of an amplifier, which comprises an input transistor $T_1$ and an emitter-follower transistor $T_2$. The base of an output transistor $T_3$ is connected to the collector of the input transistor $T_1$. The collector of the output transistor $T_3$ is connected to a resistance-capacitance circuit, comprising a resistor $R_2$ and a pair of capacitors $C_1$, $C_2$, having a time constant which advantageously corresponds to the starting or coasting time of the motor 3.

The differentiating stage 4 has a rising frequency response, i.e. a gain increasing with frequency. With the circuit shown, the differentiating stage 4 may be used to produce sampling pulses. Certain modifications of this circuit suitable for that purpose have been illustrated in our prior U.S. Pat. No. 3,806,789 granted on parent application Ser. No. 206,466. The capacitor $C_1$ prevents an excessive increase of the gain with high frequencies. The a.c. voltage which is generated by the photoconductor 1 in response to the light from a reflecting shutter, which is usually provided in motion-picture cameras, should be only slightly amplified. This is ensured by the capacitor $C_1$ and the resistor $R_2$. On the other hand, this a.c. voltage should give rise to a response of the motor-controlling bridge circuit because the intermittent control of the motor results in a proportional range and an exact adjustment.

The comparator circuit 5 consists essentially of a transistor bridge including PNP transistors $T_4$, $T_6$ in one pair and NPN transistors $T_5$, $T_7$ in another pair of adjoining bridge arms. This bridge circuit ensures that a voltage having the correct polarity is applied to the motor 3 in accordance with the signal appearing in the output diagonal of the resistance bridge constituted by the photoconductor 1 and the resistors $R_1$, $R_4$, $R_5$. This output diagonal, it will be noted, coincides with one diagonal of transistor bridge $T_4$ - $T_7$ whose other diagonal is connected across the energizing circuit of motor 3.

The shorter the coasting time of the motor 3, the more advantageous and simpler is the circuitry which can be selected for the differentiating stage 4. For this reason it is desired to short-circuit and thus to brake the motor 3 when the controlling bridge circuit is balanced. Some problems arise, however, in connection with the short-circuiting of a motor within a comparator circuit. Above all, the balance of the bridge circuit must not be disturbed. Besides, relays should be avoided, if possible, because they give rise to difficulties. In the circuit we have shown, the problem has been solved in that either pair of diagonally opposite, complementary transistors ($T_4$, $T_7$ or $T_5$, $T_6$) can be rendered conducting to the exclusion of the other pair to which the same potential is applied. This will be the case when the same voltage is applied to the input terminals 6, 7 of the comparator circuit and is transmitted by two ancillary NPN input transistors $T_8$, $T_9$ to the bases of respective ancillary control transistors $T_{10}$, $T_{11}$ connected to the collectors of ancillary input transistors $T_8$, $T_9$ whose emitters are tied to a common activating lead. The base of each of the two PNP bridge transistors $T_4$, $T_6$ is connected to a respective voltage divider which comprises a resistor $R_6$ or $R_7$ having a relatively high resistance in series with a pair of cascaded diodes $D_1$ or $D_2$ connected across the emitter-collector circuit of the respective control transistor $T_{10}$ or $T_{11}$. As long as the control transistors $T_{10}$, $T_{11}$ are cut off, base current flows through the diode pair $D_1$ or $D_2$ and through resistors $R_8$, $R_9$ or $R_{10}$, $R_{11}$ in series therewith, the junctions of the last-mentioned resistor pairs being connected to the bases of the NPN bridge transistors $T_5$, $T_7$. As a result, the bridge transistors $T_4$, $T_6$ are conducting whereas the other two bridge transistors $T_5$, $T_7$ remain cut off.

When the bridge circuit is unbalanced, the input transistor $T_8$, for instance, will draw more current and the threshold voltage at a biasing resistor $R_{12}$ for the control transistor $T_{10}$, connected between bus bar 30 and the collector of transistor $T_8$, will be exceeded so that transistor $T_{10}$ is rendered conducting. As a result, the potential of the junction between the resistor $R_8$ and the diode pair $D_1$ is increased so that the bridge transistor $T_4$ is cut off first. As the current through the control transistor $T_{10}$ increases, the current flowing through the biasing resistors $R_8$, $R_9$ associated with the bridge transistor $T_5$ will increase so that its threshold voltage is exceeded and the transistor $T_5$ is rendered conducting. The motor 3 is then energized via the bridge transistors $T_5$ and $T_6$. As soon as the bridge circuit is balanced, the bridge transistor $T_5$ is cut off and the bridge transistor $T_4$ is rendered conducting.

This arrangement may be used as an exactly operating automatic diaphragm-control system, which strongly suppresses hunting. The advantage which is due to the differentiating stage 4 will be obtained if the motor 3 consists of a rotor motor or of a galvanometer. In the former case, however, the advantages afforded by the differentiating stage 4 are even more significant, particularly if the motor is intermittently energized. In this case, however, the motor, stepped with a pulse-space ratio of, e.g., 1:1, draws a high current on stopping which is even higher than when the motor is running. For this reason it is highly desirable to deenergize the motor 3 when the bridge is balanced.

For this purpose we have provided the aforementioned differentiating amplifier 8 connected across the input terminals 6, 7 of the comparator circuit 5. The differential amplifier 8 is of conventional design, with a pair of NPN transistors $T_{24}$, $T_{25}$ having their emitters grounded through a common resistor 31, except that an OR gate 11 is connected to its output terminals 9, 10 so as to transform the oppositely varying collector voltages of transistors $T_{24}$ and $T_{25}$ into unipolar (here negative) driving voltages for a control stage 12 which includes a transistor $T_{13}$. The collector of the transistor $T_{13}$ is connected through a resistor $R_{16}$ to a switching circuit which consists of a constant-current source 13 comprising a transistor $T_{12}$. When an unbalance of the resistance bridge 1, $R_1$, $R_4$, $R_5$ results in an output signal at one of the terminals 9 and 10, the control stage 12 renders the transistor $T_{12}$ conducting to ground the emitters of input transistors $T_8$, $T_9$ of the comparator circuit 5 via a resistor 32. In the balanced state, when the OR gate 11 has no output, the transistor bridge $T_4$ to $T_7$ is blocked as transistors $T_8$, $T_{10}$, $T_5$ on the left and their counterparts $T_9$, $T_{11}$, $T_7$ on the right are cut off. Motor 3 is then short-circuited by the conducting transistors $T_4$ and $T_6$.

In the embodiment shown by way of example, the two input transistors $T_8$, $T_9$ of the comparator circuit 5 also constitute a differential amplifier and could therefore be used to control the OR gate 11, eliminating the need for an additional differential amplifier 8.

Figure 2:
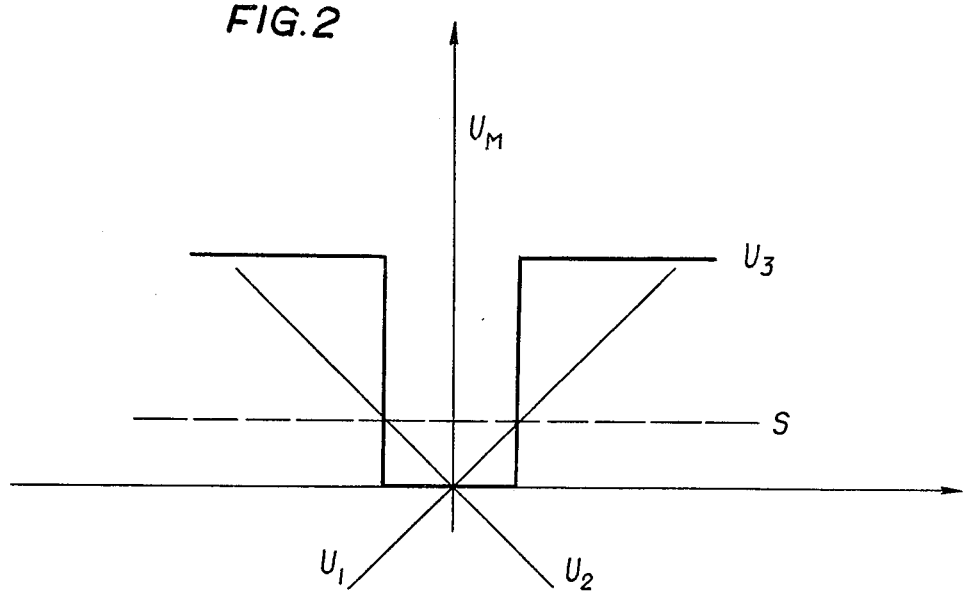
FIG. 2 is a graph illustrating the switching function of a circuit arrangement according to the invention.

The switching functions of the circuit arrangement according to the invention is apparent from FIG. 2. It may be assumed that a voltage $U_1$ is applied to one input of the OR gate 11 and a voltage $U_2$ of the same magnitude but opposite polarity is applied to the other input. The threshold level of the two diodes of the OR gate is indicated by the dotted line S. The resulting output voltage $U_3$ is indicated by a heavy solid line and is shown to have an axis of symmetry $U_m$. For certain applications it may be desirable to provide instead an output voltage $U_3$ having exactly the opposite course, i.e., one which is cut off when the input voltages $U_1$, $U_2$ rise above the threshold level and vice versa. The axis of symmetry $U_M$ which is shown may be shifted inasmuch as the base of one of the input transistors of the differential amplifier 8, i.e. transistor $T_{25}$, is connected to an adjustable voltage divider $R_4$, $R_5$. The common emitter resistor 31 used for the two transistors $T_{24}$, $T_{25}$ forming the differential amplifier 8 could also be made variable so that the width of the step resulting in the output voltage $U_3$ can be adjusted. In this case, the arrangement according to the invention affords the special advantage that it permits of a more exact and much narrower switch differential. Finally, the switching step of the output voltage $U_3$ need not be symmetrical about the axis $U_M$ because the resistors $R_{14}$, $R_{15}$ may be made adjustable so that a displacement relative to the axis of symmetry $U_M$ may be adjusted carried out. For higher requirements, the emitter resistor 31 of the differential amplifier 8 may consist of a constant-current source. A capacitor $C_4$ in the input of transistor $T_{24}$ prevents small variations in the illumination of photocell 1 from significantly affecting the output voltage of stage 12.

Figure 3:
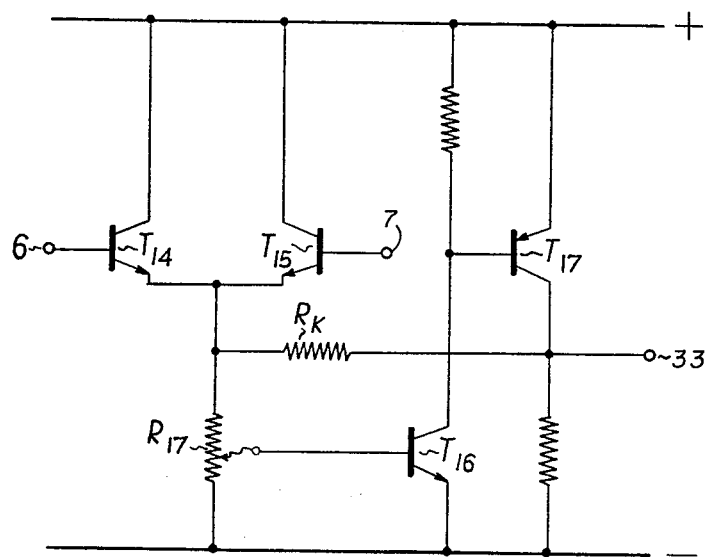
FIG. 3 shows a different embodiment.

Within the scope of the invention, an embodiment which is simplified compared to the embodiment of FIG. 1 may be provided. In that simplified embodiment, the diodes of the OR gate consist of the emitter diodes of the output transistors of the differential amplifier. Such embodiment is shown in FIG. 3 with omission of the motor 3 and other elements shown in FIG. 1. In this case, transistors $T_{14}$, $T_{15}$ connected to the input terminals 6, 7 constitute a differential amplifier and have emitter diodes which form the OR gate. A resulting output signal is derived from the emitters of these two transistors $T_{14}$, $T_{15}$ and is applied via a voltage divider $R_{17}$ to the base of an input or first-stage transistor $T_{16}$ of a Schmitt trigger. The collector of the input transistor $T_{16}$ of the Schmitt trigger is connected to an output or second-stage transistor $T_{17}$, and the collector of the latter is connected to an output terminal 33. The output transistor $T_{17}$ is suitably coupled to the base of the input transistor $T_{16}$ by a feedback resistor $R_K$, which has a relatively high resistance.

Whereas the circuitry shown in FIG. 3 is simpler than that of FIG. 1, it may be a disadvantage that an amplification is not possible because the output signal is taken from the emitters of the transistors $T_{14}$, $T_{15}$. For those cases in which an amplification is desired, the connection of the OR gate to the collector outputs of a separate differential amplifier is preferred. In such embodiment, the switching circuit 13 connected to the output of network 8, 12 may also consist of a Schmitt trigger. The transistor $T_{12}$ of the constant-current source may constitute also the output transistor of the Schmitt trigger. The positive feedback by means of the resistor $R_K$ shown in FIG. 3 affords a particularly low hysteresis. This resistor may be adjustable.

Various modifications are possible within the scope of the invention. For instance, the control transistors $T_{10}$, $T_{11}$ and/or the bridge-controlling transistors $T_{24}$, $T_{25}$ may be provided with emitter followers. In the embodiment of FIG. 1, the control stage 12 may also be the first stage of a Schmitt trigger whose second stage may consist of the transistor $T_{12}$ of the constant-current source 13.

Figure 4:
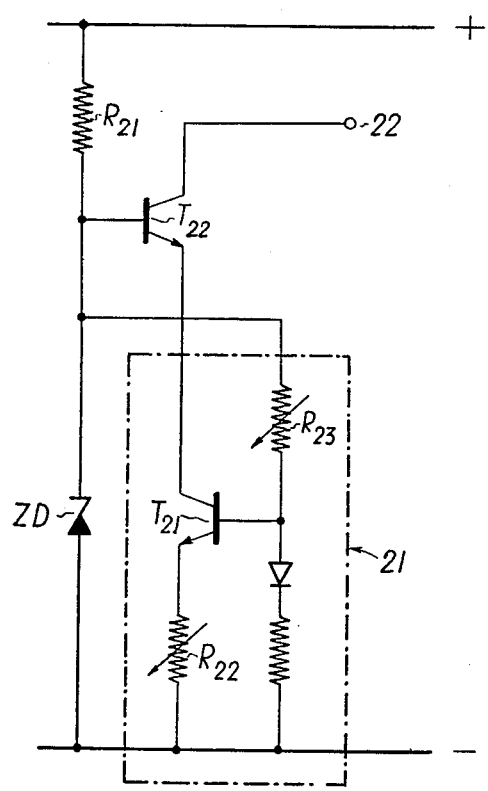
FIG. 4 illustrates a constant-current source to be used in a system according to the invention.

According to FIG. 4, a constant-current source 21 of conventional design comprises an NPN transistor $T_{21}$ in a common-emitter circuit. Such constant-current source 21 inherently has the aforedescribed disadvantage of a certain dependence of its collector current upon collector-emitter voltage. To eliminate this disadvantage, the collector or output electrode of the first transistor $T_{21}$ is connected to the emitter of a second NPN transistor $T_{22}$ operating in the common-base mode. A voltage divider connected to the base of the transistor $T_{22}$ consists of a resistor $R_{21}$ and a voltage limiter in the form of a Zener diode ZD. In the embodiment shown, that Zener diode has a dual function. It has a temperature response with such high positive temperature coefficient that the negative temperature response of the base-emitter diode of transistor $T_{22}$ is compensated. On the other hand, the Zener diode applies a fixed biasing voltage to the base of transistor $T_{21}$ of the constant-current source 21. An output terminal 22 is connected to the collector of transistor $T_{22}$ which is in series with transistor $T_{21}$.

It may be mentioned that the emitter and base resistors $R_{22}$ and $R_{23}$ of transistor $T_{21}$ of the constant-current source 21 may be adjustable. The circuit arrangement according to FIG. 4 is capable of meeting extremely high requirements as to current stabilization. With a network of this type used as the constant-current source 13 of FIG. 1, a high degree of accuracy can be obtained within wide temperature ranges by the use of relatively simple and inexpensive circuitry.

I claim:

1. A circuit arrangement for detecting deviations of the setting of an adjustable camera diaphragm from a preselected value, comprising:
   a differential amplifier provided with a first input connected to a source of reference voltage and with a second input connected to an output of a photoelectric transducer juxtaposed with the diaphragm for illumination therethrough, said differential amplifier further having rectifying output means generating an unbalance signal of predetermined polarity in the presence of a difference of either polarity between said reference voltage and an output voltage of said transducer;
   a normally inactive comparison circuit connected across said first and second inputs and provided with an activating lead; and
   switching means connected between said output means and said activating lead for placing said comparison circuit in an operative condition in response to said unbalance signal.

2. A circuit arrangement as defined in claim 1 wherein said comparison circuit comprises a transistor bridge including a first pair of complementary bridge transistors and a second pair of complementary bridge transistors on opposite sides of an input diagonal, a first and a second resistive voltage divider respectively associated with said first and second pairs of bridge transistors and connected across a direct-current power supply in parallel with said input diagonal, each pair of bridge transistors having bases connected to separate taps on the associated voltage divider for biasing thereby, and first and second ancillary transistor means respectively connected across sections of said first and second voltage dividers including one of said taps thereof, said first and second ancillary transistor means having control electrodes respectively connected to said first and second inputs and having other electrodes connected to said activating lead, said bridge further having an output diagonal connected across a load.

3. A circuit arrangement as defined in claim 2 wherein said bridge transistors include two PNP transistors in two adjacent bridge arms on one side of said output diagonal and two NPN transistors in two adjacent bridge arms on the other side of said output diagonal.

4. A circuit arrangement as defined in claim 3 wherein the taps of said sections of said voltage dividers are symmetrically connected to the bases of two bridge transistors of like conductivity type.

5. A circuit arrangement as defined in claim 2 wherein each of said ancillary transistor means comprises a group of cascaded transistors, said activating lead being a common emitter circuit for an ancillary transistor from each of said groups.

6. A circuit arrangement as defined in claim 5 wherein said switching means comprises a Schmitt trigger with an output stage in said common emitter circuit.

7. A circuit arrangement as defined in claim 2 wherein said switching means comprises a constant-current source.

8. A circuit arrangement as defined in claim 7 wherein said constant-current source comprises a pair of homopolar series transistors connected across said power supply and provided with bases connected to respective sources of fixed biasing potential, and a resistor inserted between an emitter of one of said series transistors and a terminal of said power supply.

9. A circuit arrangement for detecting the existence of voltage differences between two signals, comprising:
 a differential amplifier provided with a first and a second input connected to a pair of voltage sources for receiving respective signal voltages therefrom, said differential amplifier further having rectifying output means generating an unbalance signal of predetermined polarity in the presence of a difference of either polarity between said signal voltages;
 a normally inactive comparison circuit connected across said first and second inputs and provided with an activating lead; and
 switching means connected between said output means and said activating lead for placing said comparison circuit in an operative condition in response to said unbalance signal.

10. A circuit arrangement as defined in claim 9 wherien said comparison circuit comprises a transistor bridge including a first pair of complementary bridge transistors and a second pair of complementary bridge transistors on opposite sides of an input diagonal, a first and a second resistive voltage divider respectively associated with said first and second pairs of bridge transistors and connected across a direct-current power supply in parallel with said input diagonal, each pair of bridge transistors having bases connected to separate taps on the associated voltage divider for biasing thereby, and first and second ancillary transistor means respectively connected across sections of said first and second voltage dividers including one of said taps thereof, said first and second ancillary transistor means having control electrodes respectively connected to said first and second inputs and having other electrodes connected to said activating lead, said bridge further having an output diagonal connected across a load.

11. A circuit arrangement as defined in claim 10 wherein said bridge transistors include two PNP transistors in two adjacent bridge arms on one side of said output diagonal and two NPN transistors in two adjacent bridge arms on the other side of said output diagonal.

12. A circuit arrangement as defined in claim 11 wherein the taps of said sections of said voltage dividers are symmetrically connected to the bases of two bridge transistors of like conductivity type.

13. A circuit arrangement as defined in claim 10 wherein each of said ancillary transistor means comprises a group of cascaded transistors, said activating lead being a common emitter circuit for an ancillary transistor from each of said groups.

14. A circuit arrangement as defined in claim 13 wherein said switching means comprises a Schmitt trigger with an output stage in said common emitter circuit.

15. A circuit arrangement as defined in claim 10 wherein said switching means comprises a constant-current source.

16. A circuit arrangement as defined in claim 15 wherein said constant-current source comprises a pair of homopolar series transistors connected across said power supply and provided with bases connected to respective sources of fixed biasing potential, and a resistor inserted between an emitter of one of said series transistors and a terminal of said power supply.

* * * * *